United States Patent [19]

Kuchiki

[11] Patent Number: 5,068,585
[45] Date of Patent: Nov. 26, 1991

[54] NUMERICAL CONTROL DEVICE

[75] Inventor: Kiyoshi Kuchiki, Aichi, Japan

[73] Assignee: Mitsubishi Denki K.K., Tokyo, Japan

[21] Appl. No.: 518,631

[22] Filed: May 2, 1990

[30] Foreign Application Priority Data

May 8, 1989 [JP] Japan .................. 1-114639

[51] Int. Cl.⁵ ............... G06F 15/46; G05B 19/405
[52] U.S. Cl. ............:............. 318/569; 318/567; 318/562; 318/573; 364/474.11; 395/1
[58] Field of Search ................ 318/560–646; 364/513, 474, 168, 169, 191–193

[56] References Cited

U.S. PATENT DOCUMENTS

| | | | |
|---|---|---|---|
| 4,029,950 | 6/1977 | Haga | 364/474.11 X |
| 4,262,336 | 4/1981 | Pritchard | 318/573 X |
| 4,288,849 | 9/1981 | Yoshida et al. | 318/562 X |
| 4,435,771 | 3/1984 | Nozawa et al. | 318/562 X |
| 4,503,507 | 3/1985 | Takeda et al. | 364/513 |
| 4,608,645 | 8/1986 | Niwa et al. | 364/474.11 X |
| 4,697,239 | 9/1987 | Sicard et al. | 364/513 X |
| 4,841,431 | 6/1989 | Takagi et al. | 364/474.11 X |
| 4,965,500 | 10/1990 | Mizuno et al. | 318/567 X |

Primary Examiner—Paul Ip
Attorney, Agent, or Firm—Sughrue, Mion, Zinn, Macpeak & Seas

[57] ABSTRACT

A numerical control device capable of controlling the drive of a plurality of objects to be controlled in a parallel mode. With a numerical control device, machining programs for the objects which should be executed in parallel, are able to being displayed or printed in a parallel mode so that the parallel driving condition can be detected visually. Further, the machining program is suspended to be listed in response to a queuing instruction as an empty block, so that the queuing instructions for the plural objects are arranged in the same line thus printed or displayed.

4 Claims, 7 Drawing Sheets ion 9 of the second
NUMERICAL CONTROL DEVICE

BACKGROUND OF THE INVENTION

This invention relates to a numerical control device for controlling a plurality of controlling objects in a parallel mode.

FIG. 1 is a block diagram showing the arrangement of a conventional numerical control device for controlling the operation of a plurality of objects to be controlled in a parallel mode according to a plurality of machining programs. In FIG. 1, reference numerals 1 and 6 designate a machining program file for a first system and a machining program file for a second system which store machining programs of the first system and a machining program of the second system, respectively; 2 and 7, a reading operation control section of the first system and a reading operation control section of the second system, which operate to read the machining programs of the first and second systems from the first and second machining program file 1 and 6, respectively; 3 and 8, a control instruction conversion section of the first system and a control instruction conversion section of the second system, which operates to convert the machining programs of the first and second systems, which have been read as described above, into control instructions, respectively; and 4 and 9, a control instruction outputting sections of the first and second systems, which operate to output control instructions according to their operating conditions, respectively; and 5 and 10, drive sections of the first and second systems which operate to drive the objects, respectively.

Further in FIG. 1, reference numeral 11 designates a setting unit for setting the outputting of the machining program files 1 and 6; 12, a setting inputting section for inputting the contents set by the setting unit 11; 13, an output data file forming section which, according to the contents inputted by the setting inputting section 12, reads the first system's machining program file 1 and the second system's machining program file 6, to form an output data file 14; 15, a data file outputting section for outputting the output data file 14; and 16, an output unit such as a printer.

The control instruction outputting section 4 of the first system and the control instruction outputting section 9 of the second system are so designed that, when control instructions include queuing instructions, the outputting is delayed until the queuing instructions come to the control instruction outputting section 9 of the second system and the control instruction outputting section 4 of the first system.

The operation of the numerical control device thus organized will be described. When the reading operation control section 2 of the first system reads one block of the machining program of the first system from the machining program file 1 of the first system, the control instruction conversion section 3 of the first system interprets and converts it into a readily controllable form. In succession, the control instruction outputting section 4 of the first system applies the control instruction to the drive section 5 of the first system according to the operating conditions such as start and stop of the object to be controlled. Similarly, when the read control section 7 of the second system reads one block of the machining program of the second system, the control instruction conversion section 8 of the second system interprets and converts it into a readily controllable form. Then, the control instruction outputting section 9 of the second system applies the control instruction to the drive section 10 of the second system according to the operating conditions such as start and stop of the object to be controlled. Thus, the objects to be controlled by the first and second systems can be operated in a parallel mode.

The machining program files 1 and 6 of the first and second systems are outputted to the output unit such as a printer as follows. When the outputting of machining program file data is set by the setting unit 11, the contents thus set are applied to the setting inputting section 12 so as to start the operation of the output data file forming section. The output data file forming section 13 first reads the machining program file 1 of the first system to store in the output data file 14. After all the machining program file of the first system has been stored, then the output data film forming section 13 reads the machining program file 6 of the second system to store in the output data file 14 in succession to the machining program file of the first system. In this case, the machining program files are stored with the contents maintained unchanged in order. After the files have been stored, the data file outputting section 15 applies the output data files to the output unit 16 such as a printer.

In this case, the output unit 16 provides an output for instance as shown in FIG. 2. In FIG. 2, reference characters B1 designates the title of the machining program of the first system; B2, B3, B4, B5 and B6, instructions of the first system; B7, the ending code of the machining program of the first system; B8, the title of the machining program of the second system; B9, B10, B11, B12, B13 and B14, instructions of the second system; and B15, the ending code of the machining program of the second system. The instructions B3 and B12 are used for the queuing of the first and second systems.

The conventional numerical control device, being designed as described above, suffers from the following difficulties. When the machining program files 1 and 6 are applied to the output unit 16 such as a printer, the machining programs of the first and second systems are applied in a series mode as shown in FIG. 8. Therefore, it is rather difficult to detect how the first and second systems are operated in a parallel mode, and it is impossible to detect at a glance where the queuing instructions occur in the first and second machining programs which are executed in a parallel mode.

SUMMARY OF THE INVENTION

Accordingly, an object of the present invention is to eliminate the above-described difficulties accompanying a conventional numerical control device. More specifically, an object of the invention is to provide a numerical control device in which the states of parallel operation are applied to an output device such as a printer in a parallel mode, and queuing instructions are outputted in such a manner that they can be detected readily, whereby the parallel operation can be confirmed statically.

The foregoing object of the invention is met by the provision of a numerical control device which according to the invention, comprises: memory means for storing a plurality of machining programs; a first data file forming means for reading the machining programs and forming a data file in which the steps of execution of the machining programs are arranged in parallel in a comparison mode; a second data file forming means for reading the machining programs and forming a data file in which the steps of execution of the machining program are arranged in parallel in a comparison mode, said second data file forming means forming a data file indicating queuing instruction part for synchronization of the machining programs; setting means for selecting and starting the first or second data file forming means; and output means for displaying outputs of the first and second data file forming means.

In the numerical control system of the invention, in response to select and start instructions from the setting means, the first or second data file forming means reads a plurality of machining programs from the memory means. Then, the first data file forming means forms a data file in which the steps of execution of the machining programs thus read are arranged in parallel in a comparison mode, and the second data file forming means forms a data file in which the steps of execution of the machining programs thus read are arranged in parallel in a comparison mode, and the queuing instruction part for synchronization of the machining programs is included, the contents being applied to the output means.

DESCRIPTION OF THE PREFERRED EMBODIMENT

Figure 1:
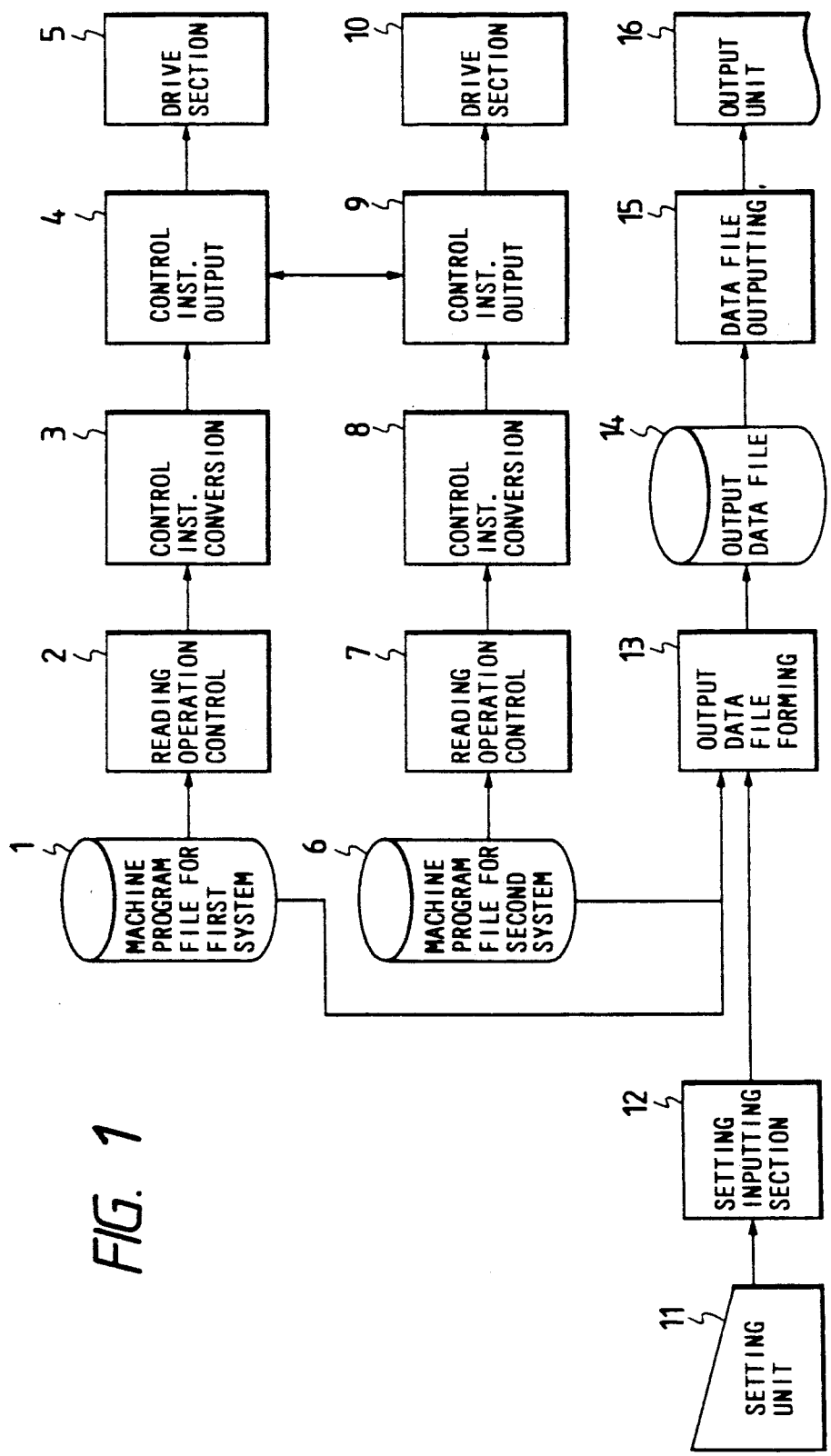
FIG. 1 is a block diagram showing the arrangement of a conventional numerical control device.
Figure 2:
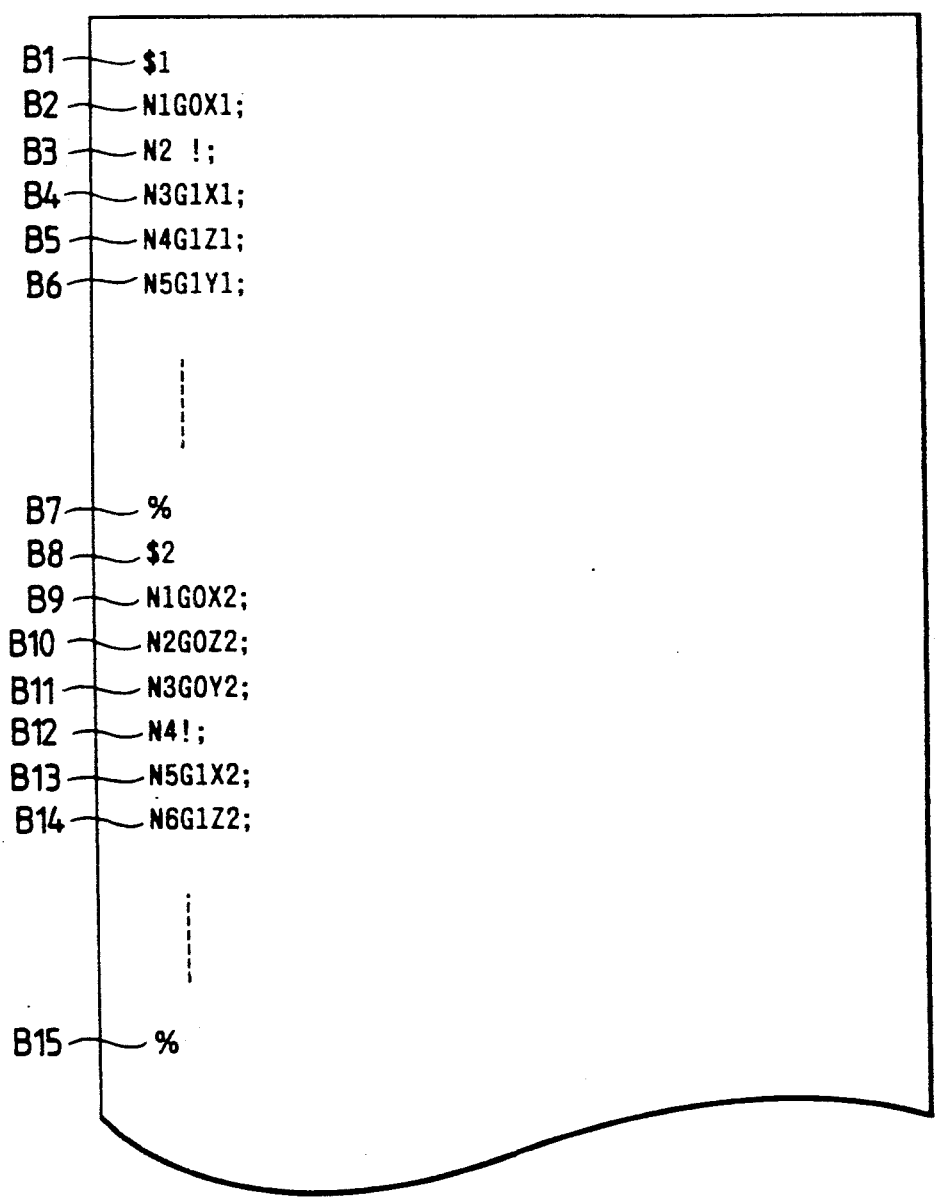
FIG. 2 is a diagram showing the contents displayed by an output unit in the conventional numerical control device.
Figure 3:
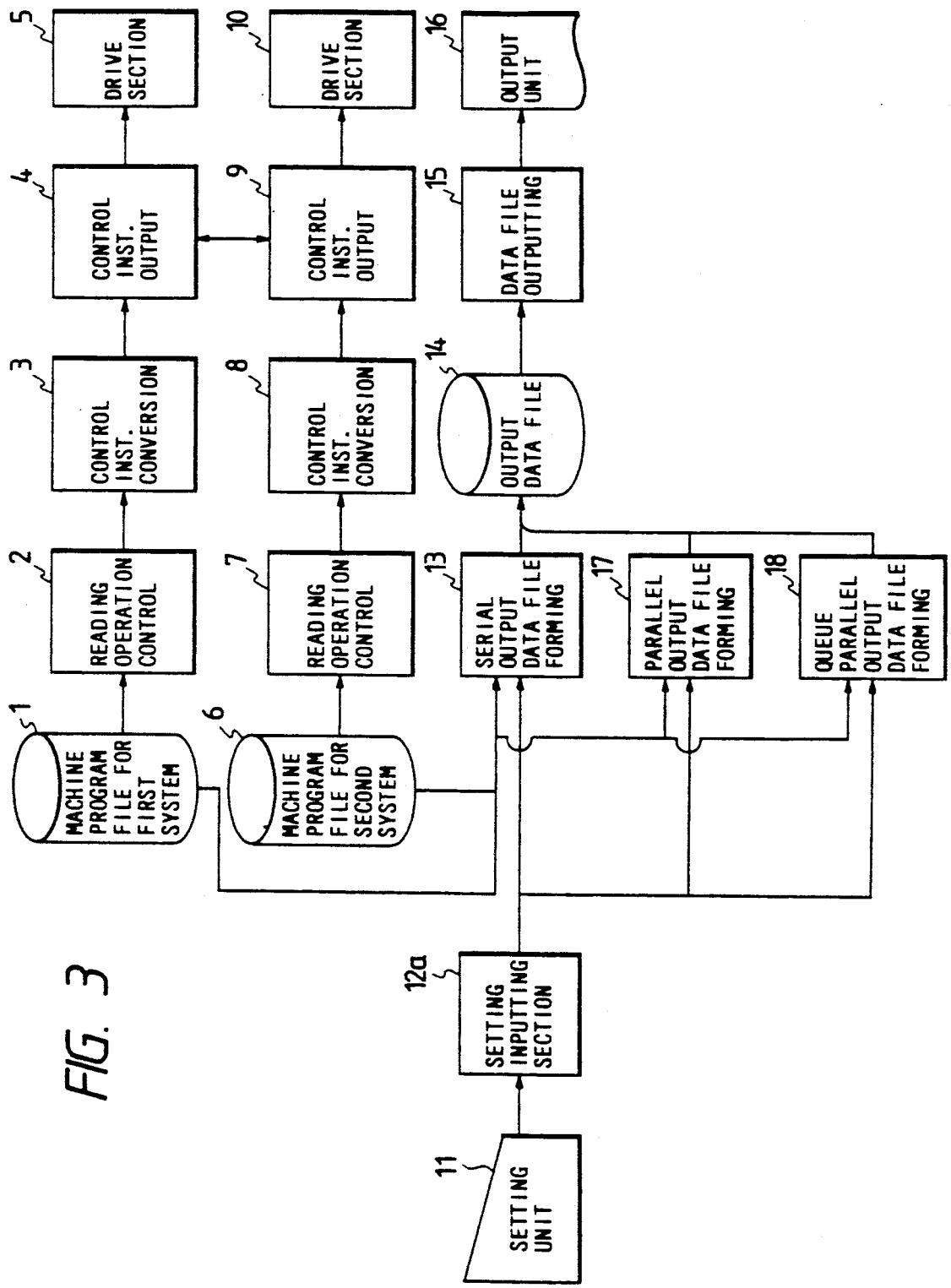
FIG. 3 is a block diagram showing the arrangement of a numerical control device according to the present invention.

An embodiment of the present invention will be described with reference to FIG. 3. In FIG. 1, the parts corresponding functionally to those which have been already described with reference to FIG. 1 are therefore designated by the same reference numerals. Further in FIG. 3, reference character 12a designates a setting inputting section for discriminating the contents set by the setting unit 11; 17, a parallel output data file forming section which reads the machining program files 1 and 6 of the first and second systems to form output data files in a parallel mode; and 18, a queue parallel output data file forming section for forming output data files in a parallel mode in such a manner that queuing can be readily detected.

The operation of the numerical control device thus designed will be described. In applying the machining program files 1 and 6 of the first and second systems to the output unit 16 such as a printer, one of the following three modes is selected and set by the setting unit 11: a series mode similar to that in the conventional numerical control device, a parallel mode, and a queue parallel mode. Upon reception of the content thus set, the setting inputting section 12a detects which of the three modes has been selected, to start one of the series output data file forming section 13, the parallel output data file forming section 17, and the queue parallel output data file forming section 18. The output data file forming section thus started operates to store the output data in the output data file according to the contents of start. Upon completion of the storage of the output data, the data file outputting section 15 applies it to the output unit 16 such as a printer.

Figure 4:
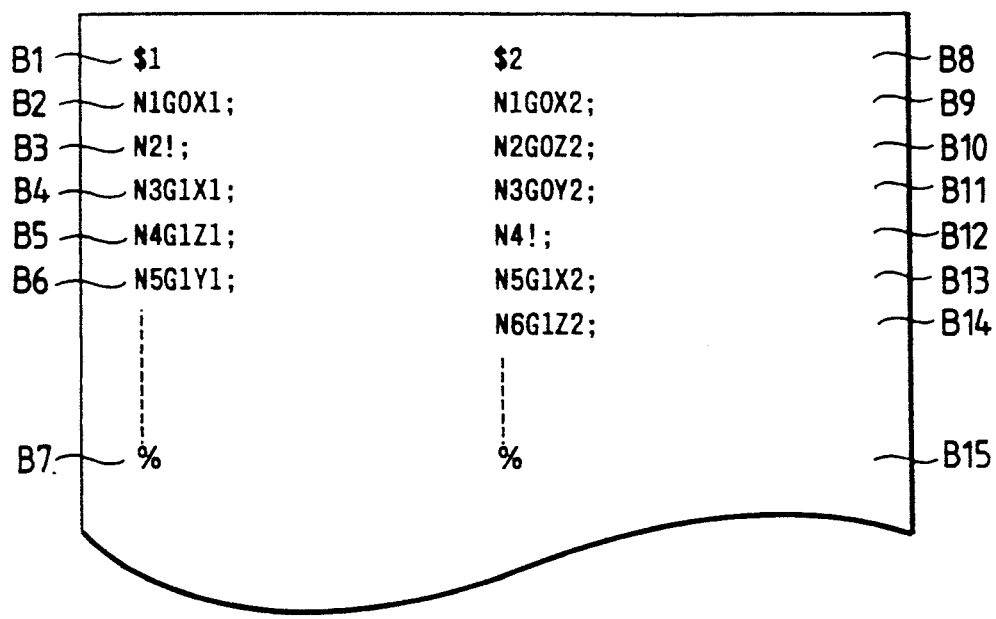
FIGS. 4 and 5 are diagrams showing the contents displayed by an output unit in the numerical control device of the invention.
Figure 5:
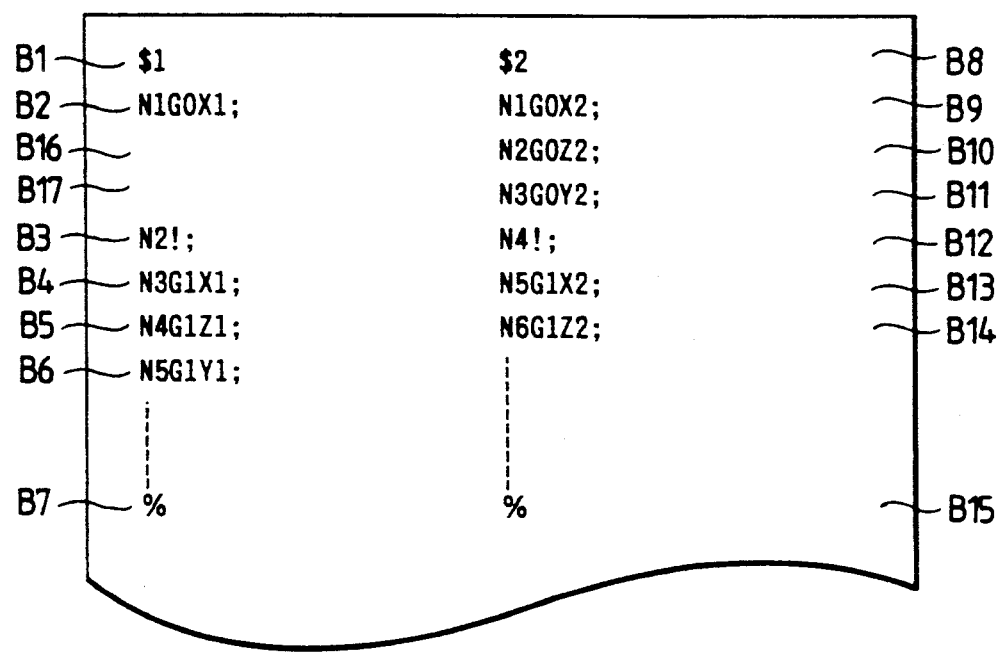

FIGS. 4 and 5 show examples of the outputs of the output unit 16 such as a printer when the parallel output mode and the queue parallel output mode are selected, respectively. In FIG. 4, the program of the first system (B1 through B7) and the program of the second system (B8 through B15) are outputted in a parallel mode. In FIG. 5, the queuing instructions B3 and B12 are provided in one and the same line, and the parallel output is effected with blanks B16 and B17 for indication of the queuing.

Figure 6:
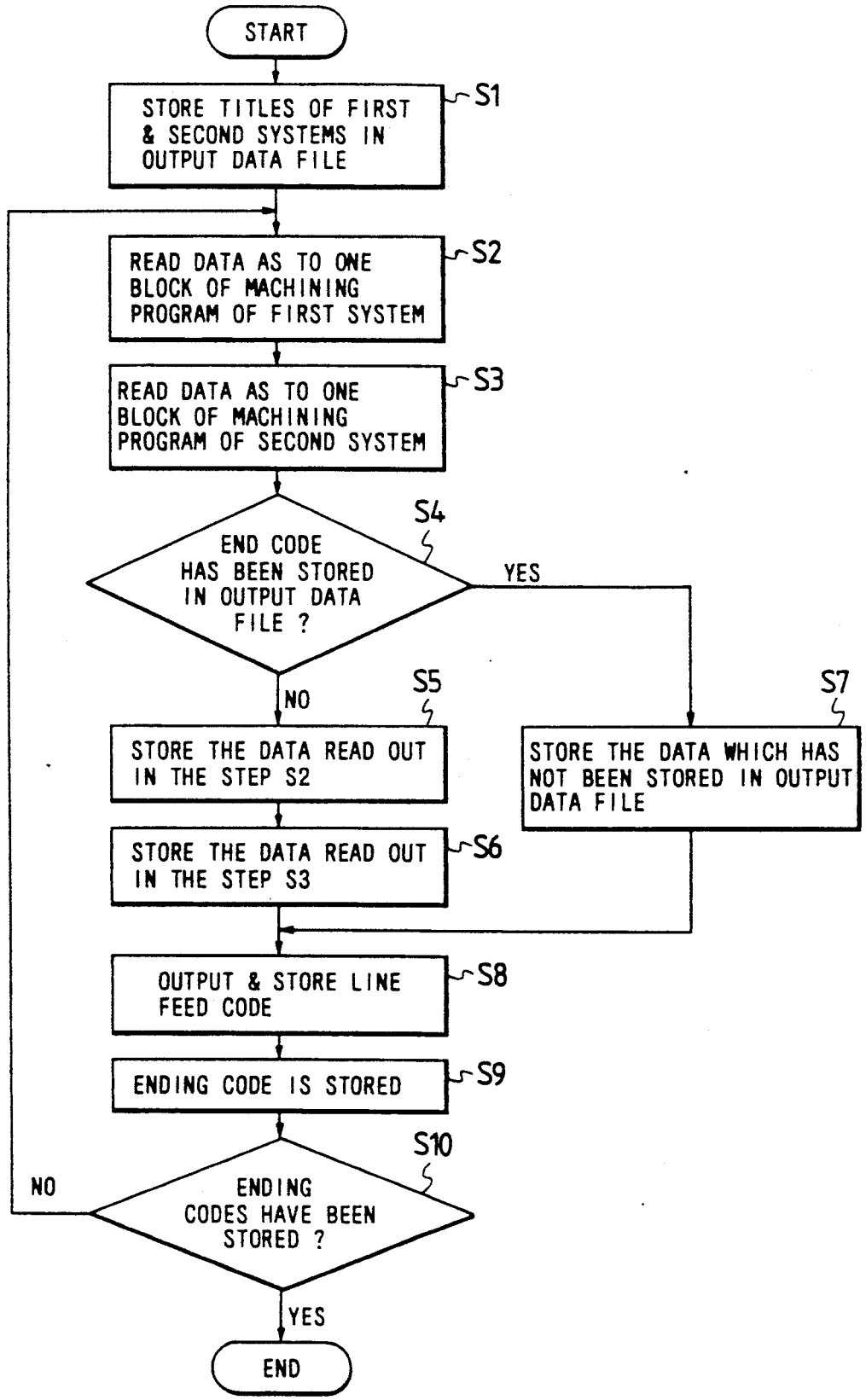
FIG. 6 is a flow chart for a description of the operation of a parallel output data file forming section in the numerical control device of the invention.
Figure 7:
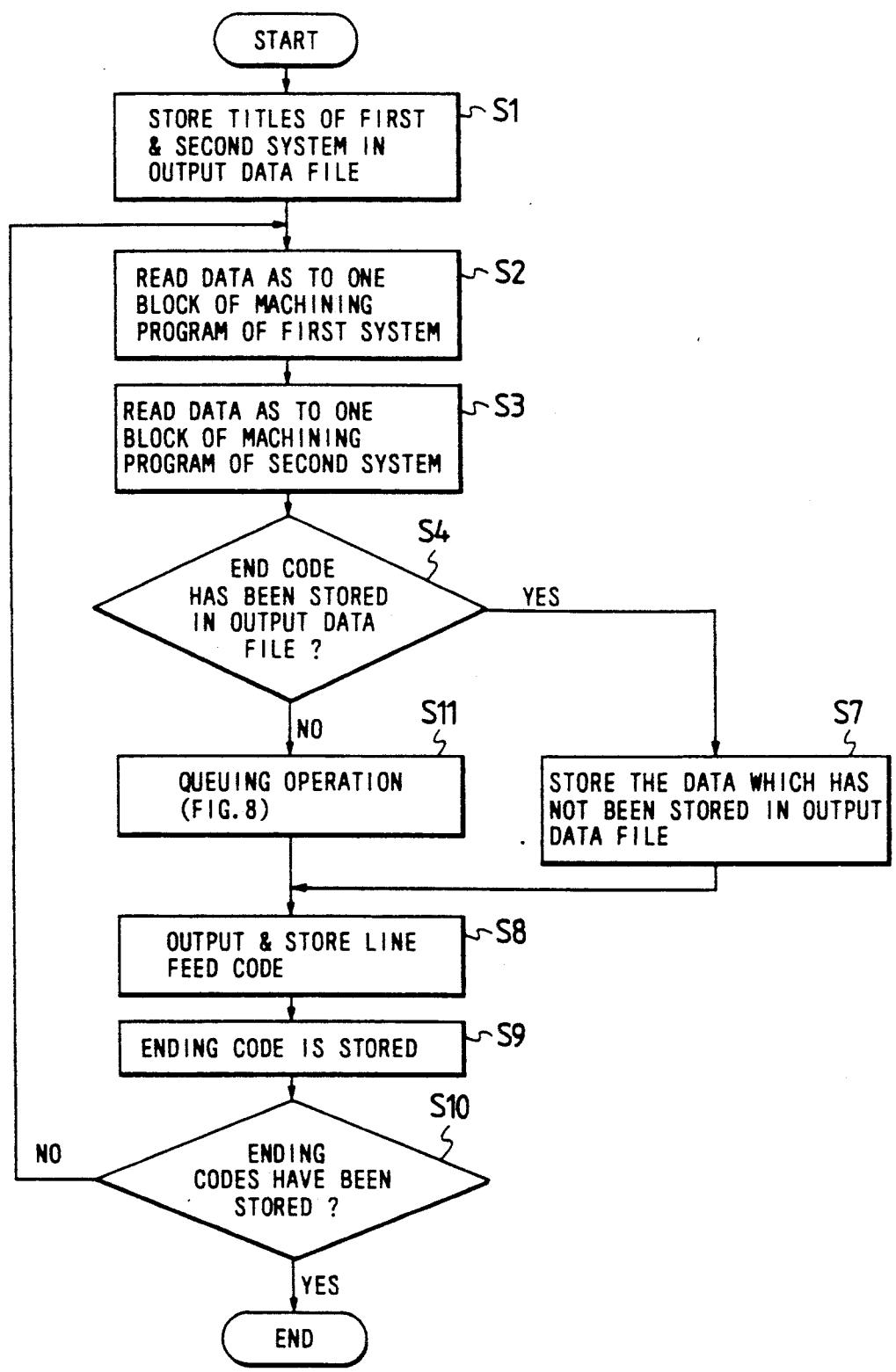
FIGS. 7 and 8 are flow charts for a description of the operation of a queue parallel output data file forming section in the numerical control device of the invention.

Now, the operations of the parallel output data file forming section 17 and the queue parallel output data file forming section 18 which are adapted to form such output data files as shown in FIGS. 4 and 5 will be described with reference to FIGS. 6 and 7 showing flow charts therefor.

First, the operation of the parallel output data file forming section 17 will be described with reference to FIG. 6.

(1) Step S1

The titles of the first and second systems are stored in the output data file 14: for instance, "$1" and "$2" are stored for the first and second systems, respectively.

(2) Steps S2 and S3

One block of the machining program is read from each of the machining program files 1 and 6.

(3) Steps S4 through S7

In the case where none of the systems have stored the ending codes of the machining programs in the output data file (Step S4), the machining program file of the first system read in Step S2 is stored in the output data file (Step S5), and then the machining program file of the second system read in Step S3 is stored in the output data file (Step S6). In the case where one of the first and second systems has stored the ending code of the machining program, the machining program of the other system is stored in the output data file (Step S7).

(4) Step S8

A line feed code for the output unit 16 such as a printer is stored in the output data file.

(5) Steps S9 and S10

For each of the systems, it is judged from an occurrence of the ending code of the machining program whether or not the machining program file is ended. The ending codes are "%" indicated at B7 and B15 in FIG. 4 (Step S9). Thereafter, when it is determined that, for each of the system, the ending code has been stored in the output data file, the operation is ended. If not, Step S2 is effected again (Step S10).

Figure 8:
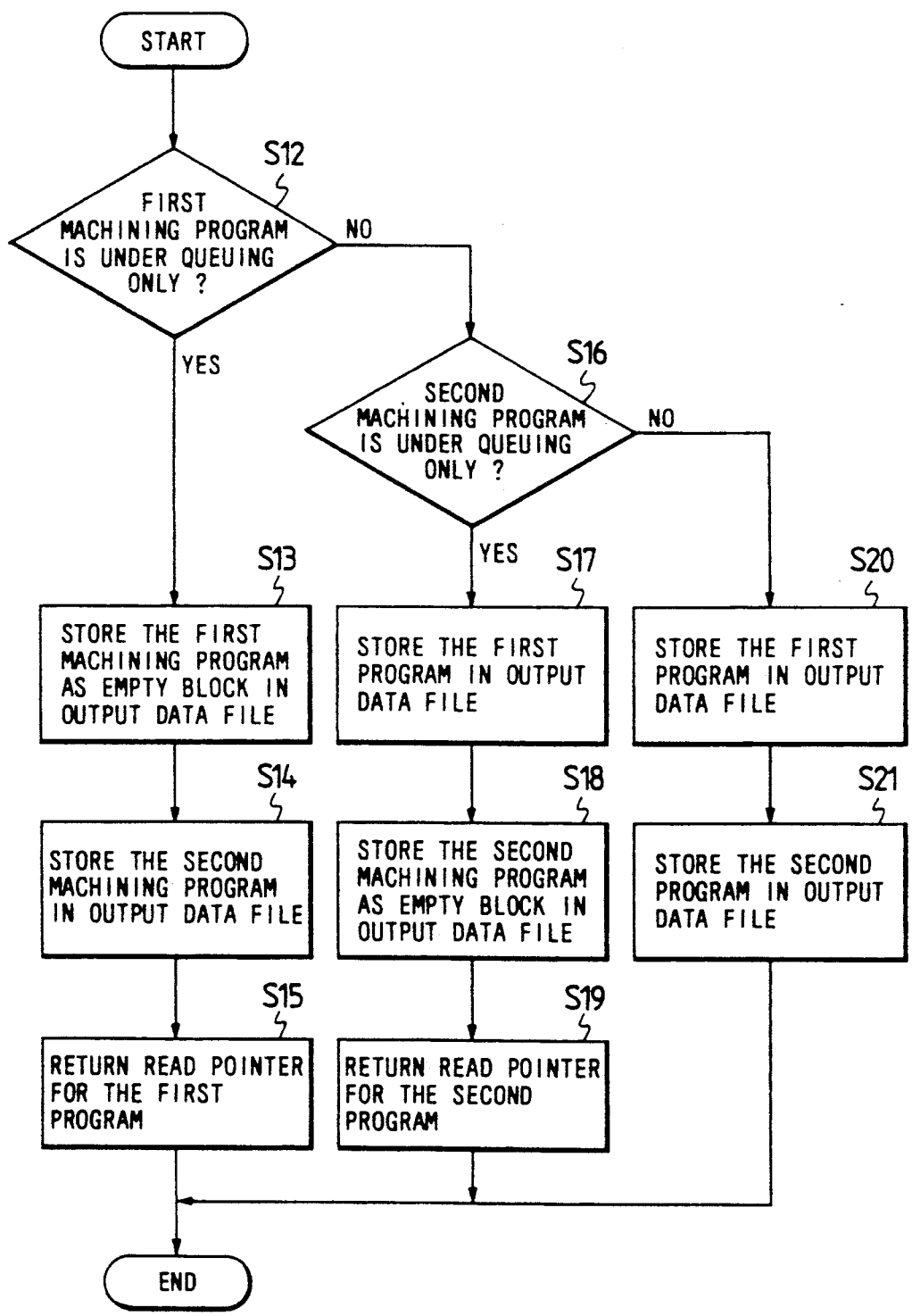

Now, the operation of the queue parallel output data file forming section 18 will be described with reference to FIGS. 7 and 8. However, it should be noted in this connection that the description of a part of the operation which is same as that of the parallel output data file forming section 17 described with reference to FIG. 6 is omitted intentionally for simplification in description. That is, the operation of the queue parallel output data file forming section 18 is different from that of the parallel output data file forming section 17 only in Step S11; i.e, a queuing operation. The queuing operation will be described with reference to FIG. 8, a flow chart.

(1) Steps S12 through S15

In the case where the machining program of the first system read in Step S2 is only under a queuing instruction whereas the machining program of the second system read in Step S3 is not under a queuing instruction (Step S12), the machining program of the first system is stored as an empty block in the output data file (Step S13), and then the instructions (other than the queuing instruction) of the machining program of the second system is stored in the output data file (Step S14). Thereafter, a read pointer is returned so that, in reading the machining program of the first system, the same machining program, i.e., queuing instruction be read again (Step S15).

(2) Steps S16 through S17

In the case where the machining program of the first system read in Step S1 is not under a queuing instruction whereas the machining program of the second system read in Step S3 is under a queuing instruction (Step S16), the instructions (other than the queuing instruction) of the machining program of the first system are stored in the output data file (Step S17), and then the machining program of the second system is stored as an empty block in the output data file (Step S18). Thereafter, the read pointer is returned so that, in reading the machining program of the second system, the same machining program be read again (Step S19).

(3) Steps S20 and S21

In the case where both the machining programs read in Steps S2 and S3 are under queuing instructions or none of them are under queuing instructions, the machining program of the first system read in Step S2 is stored in the output data file (Step S20), and then the machining program of the second system read in Step 3 is stored therein. That is, where, as shown in FIG. 5, the machining program of the first system is under the queuing instruction B3 while the machining program of the second system is under the queuing instruction B12, then "N2!;" and "N4!;" are stored in the same line. When, on the other hand, the machining program of the first system is under the instructions B2, B4, B5 and B6 other than the queuing instruction, and the machining program of the second system is under the instructions B9, B13 and B14 other than the queuing instruction, then those instructions are stored in the output data file as they are.

The invention has been described with reference to the outputting of the machining programs of two systems, the first system and the second system. However, it should be noted that the technical concept of the invention may be equally applicable to the case of outputting the machining programs of more than two systems; that is, in this case, the number of kinds of machining programs to be handled is increased, but the operation is substantially similar to that which has described above.

In the above-described embodiment, three output data file forming sections, namely, the series output data file forming section, the parallel output data file forming section, and the queue parallel output data file forming section are provided; however, they may be combined into one unit as the case may be.

Furthermore in the above-described embodiment, the empty block is outputted during queuing: however, a different block may be outputted to indicate the queuing operation.

As was described above, with the numerical control system of the invention, in response to select and start instructions from the setting means the first or second data file forming means reads a plurality of machining programs from the memory means, and the first data file forming means forms a data file in which the steps of execution of the machining programs thus read are arranged in parallel in a comparison mode, and the second data file forming means forms a data file in which the steps of execution of the machining programs thus read are arranged in parallel in a comparison mode, and the queuing instruction part for synchronization of the machining program is included, the contents thereof being applied to the output means. Therefore, visual confirmation of the parallel operation of a plurality of machining programs can be readily and quickly achieved, and any error in programs can be detected before execution.

In those figures, like parts are designated by like reference numerals or characters.

What is claimed is:

1. A numerical control device which is capable of controlling at least two external units in parallel mode according to a plurality of machining programs, respectively, comprising:

memory means for storing the plurality of machining programs each of which is assigned to one of said units;

a first data file forming means for reading the plurality of machining programs to form a first data file in which a first series of steps of execution for one of said plurality of machining program sis arranged in parallel with at least a second series of steps of execution for the another of said plurality of machining programs;

a second data file forming means for reading the plurality of machining programs to form a second data file in which said first series of steps of execution for said one of said plurality of machining programs is arranged in parallel with at least said second series of steps of execution for another of said plurality of machining programs, said second data file forming means being responsive to queuing instructions contained in said first series of steps and said second series of steps for synchronizing the parallel arrangement;

setting means for selecting and starting either said first or second data file forming means; and output means for selectively displaying outputs of one of said first and second data forming means.

2. The device as defined in claim 1 wherein, in response to a queuing instruction in one of the plurality of machining programs, a queuing instruction in said another machining program is arranged in parallel with the queuing instruction in said one of the plurality of machining programs.

3. The device as deferred in claim 2 wherein data indicating the queuing instructions one arranged on the same line in the display of said output means.

4. The device as defined in claim 3, wherein a number of steps of one of said machining programs are formed as empty blocks to accommodate said arrangement of said queuing instructions in the same line of said display.

* * * * *